G. R. BUCKMAN.
Injector for Steam-Boilers.
No. 212,438. Patented Feb. 18, 1879.
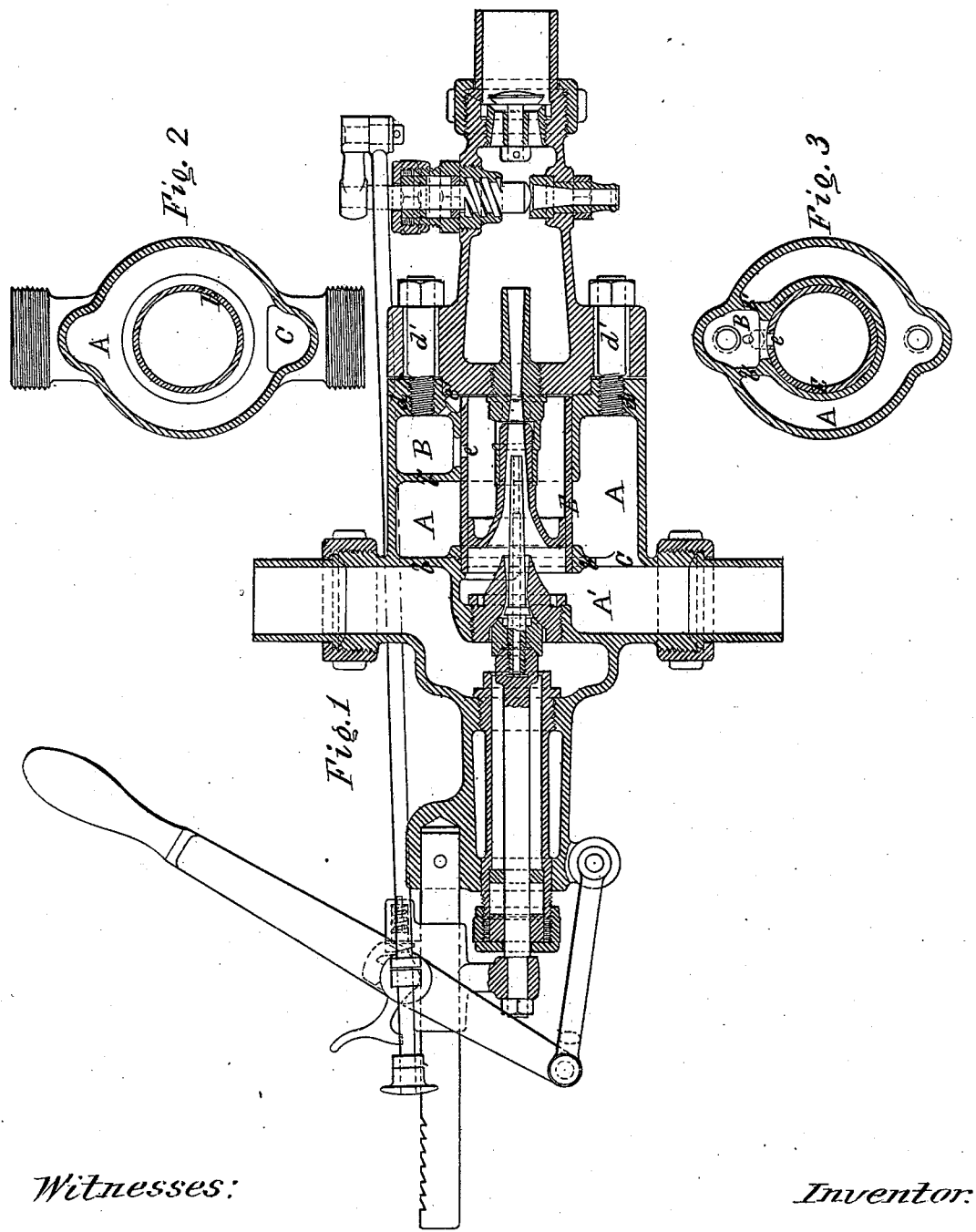
Witnesses:
David L Lukim
Geo B Schnacke
Inventor:
Geo R Buckman

UNITED STATES PATENT OFFICE.

GEORGE R. BUCKMAN, OF PHILADELPHIA, PENNSYLVANIA, ASSIGNOR TO WILLIAM SELLERS, OF SAME PLACE.

IMPROVEMENT IN INJECTORS FOR STEAM-BOILERS.

Specification forming part of Letters Patent No. 212,438, dated February 18, 1879; application filed November 5, 1878.

*To all whom it may concern:*

Be it known that I, GEO. R. BUCKMAN, of the city and county of Philadelphia, and State of Pennsylvania, have invented a certain new and useful Improvement in Self-Adjusting Injectors for Feeding Steam-Boilers; and I declare the following to be a full and exact description thereof.

This improvement is applicable to all forms of self-adjusting injectors; but as I have adapted it to that form described in the United States Patent No. 208,425, dated September 24, 1878, the drawings represent this construction.

The injector described in that patent is provided with an air-chamber, in connection with a water-supply pipe; and my improvement consists in providing an additional air-chamber in connection with the overflow-chamber; and it further consists in combining, with an injector-case which supports the nozzles of a self-adjusting injector in position, a water-chamber, an air-chamber in connection therewith, and an air-chamber in connection with the overflow-chamber.

The air-chamber, in connection with the overflow-chamber, is provided with a contracted conduit or conduits between the air and overflow chambers, such as described in the aforesaid patent as placed between that air-chamber and the water-supply pipe, this additional air-chamber, with its contracted conduits, preventing the injurious effect of the heat upon the one air-chamber, in connection with the water-supply pipe, as set forth in the aforesaid patent, so that the contracted conduits between that chamber and the supply-pipe may be dispensed with, and the chamber itself may be incased within the body of the instrument, as will be understood by referring to the drawings, which form part of this specification, and which represent an injector embodying my present improvements.

Figure 1 shows an injector in longitudinal section. Fig. 2 shows an injector in cross-section through the air-chamber, in connection with the water inlet and chamber. Fig. 3 shows an injector in cross-section through the air-chamber, in connection with the overflow-chamber.

As the operating parts of this injector are fully described in the aforesaid Patent No. 208,425, I deem it unnecessary to give any further description thereof herein.

The air-chamber A, in connection with the water-chamber A', is formed within the outer shell or case of the injector by inwardly-projecting flanges $b$ and $b'$, the flange $b$ separating this air-chamber from the water-chamber and inlet except at the opening $c$ in the flange $b$, by which communication is established between the lower side of the air-chamber and the water inlet and chamber.

The flange $b'$ also separates the chamber A from the air-chamber B, which latter is surrounded by the flange $b'$, as shown in Fig. 3, and is connected with the overflow-chamber, as will be more fully described hereinafter.

The outer end of the chamber B is closed by the heavy flange $d\ d$, which serves also to hold securely the bolts $d'\ d'$, by means of which the two parts of the outer case are held together.

The flanges $b\ b'$ and $d\ d$ are provided with cylindrical projections, and these projections, between $b'$ and $d\ d$, are united, and all are bored out to receive the combining-tube cylinder E, which sustains and guides the piston of the combining-tube, and also cuts off the communication between the chambers A and B as it forms the inner side, and, with the parts previously described, completes the air-chambers A and B.

The air-chamber B is connected with the overflow-chamber by two conduits, $e$ and $e'$, the former bored through the cylinder E, the latter through the flange $d'\ d$ just outside the cylinder E, so that when the injector is in position to operate one of these conduits will be above the other, so as to facilitate the escape of water that may enter the air-chamber, as described in the before-mentioned Patent No. 208,425.

Having thus fully described the nature of my invention and the best way known to me for practicing the same, what I claim as new, and desire to secure by Letters Patent, is—

1. In a self-adjusting injector, an air-chamber in communication with the water-supply pipe, in combination with an air-chamber in communication with the overflow-chamber, substantially as and for the purposes set forth.

2. In combination, an injector-case which supports the nozzles of a self-adjusting injector in position, a water-chamber, an air-chamber in connection therewith, and an air-chamber in connection with the overflow-chamber, substantially as and for the purposes set forth.

GEO. R. BUCKMAN.

Witnesses:
DAVID L. LUKENS,
JNO. H. SCHMACKE.